United States Patent
Tatsumi et al.

[11] Patent Number: 5,648,986
[45] Date of Patent: Jul. 15, 1997

[54] RECEIVER IN DIGITAL RADIO COMMUNICATION DEVICE WITH SELECTIVE EQUALIZATION

[75] Inventors: Kaoru Tatsumi, Sagamihara; Kazuo Yamamoto, Hachioji, both of Japan

[73] Assignee: Kabushiki Kaisha Toshiba, Kanagawa, Japan

[21] Appl. No.: 564,239

[22] PCT Filed: Jun. 21, 1994

[86] PCT No.: PCT/JP94/00988

§ 371 Date: Dec. 19, 1995

§ 102(e) Date: Dec. 19, 1995

[87] PCT Pub. No.: WO95/01035

PCT Pub. Date: Jan. 5, 1995

[30] Foreign Application Priority Data

Jun. 21, 1993 [JP] Japan .................. 5-149543

[51] Int. Cl.⁶ .................. H03D 3/22; H04L 27/22
[52] U.S. Cl. .................. 375/229; 329/316; 375/316
[58] Field of Search .................. 375/377, 316, 375/229, 230; 455/134, 238.1; 329/316, 318, 327

[56] References Cited

U.S. PATENT DOCUMENTS

| | | | |
|---|---|---|---|
| 5,159,282 | 10/1992 | Serizawa et al. | 329/316 |
| 5,212,803 | 5/1993 | Uddenfeldt et al. | 375/349 |
| 5,283,531 | 2/1994 | Serizawa et al. | 375/232 |
| 5,363,411 | 11/1994 | Furuya et al. | 375/316 |
| 5,448,602 | 9/1995 | Ohmori et al. | 375/330 |
| 5,450,442 | 9/1995 | Umemoto et al. | 375/230 |

*Primary Examiner*—Stephen Chin
*Assistant Examiner*—Betsy L. Deppe
*Attorney, Agent, or Firm*—Finnegan, Henderson, Farabow, Garrett & Dunner, L.L.P.

[57] ABSTRACT

A digital radio communication device which prevent deterioration of an error rate of a demodulated signal caused by equalization processing of an output of a digital demodulation circuit, and that can always provide optimal reception regardless of presence or absence of delayed waves. A bit error estimation circuit 6 estimates a bit error of demodulated serial data S3 output by the digital demodulation circuit 6 and outputs results of estimation to a control circuit 7 as an estimated bit error signal S5. The control circuit 7 switches a selector 9 through a selector control signal S6 generated on the basis of the estimated bit error signal S5 and the received field strength indicator signal S2 from a reception circuit 2 so as to select the demodulated serial data S3 or S4 output by either the digital demodulation circuit 6 or the equalizer 5 for output as demodulated data S7.

11 Claims, 9 Drawing Sheets

RECEIVER IN DIGITAL RADIO COMMUNICATION DEVICE WITH SELECTIVE EQUALIZATION

TECHNICAL FIELD

The present invention relates to a digital radio communication device for use in digital mobile radio communication systems employing digital demodulation, such as car•portable phone systems and cordless phone systems, that is provided with digitally demodulated signal equalization means, and more particularly to a improvement to the structure of the demodulation circuit so that the equalization process by the equalization means can be canceled if necessary.

BACKGROUND ART

In recent years, the development of mobile digital radio communication systems by which not only control signals but also digitized communication data such as communication voice signals may be transmitted has advanced.

Known digital radio communication devices used in this type of system include devices provided with an equalizer in the receiving system. This equalizer is a functional circuit that compensates for intersymbol interference produced at times when there is delayed propagation of radio signals due to multipath fading, and is constructed using a transversal filter, for example.

With conventional equalizer-equipped digital radio communication devices of this type, the demodulated signal bit error rate sometimes deteriorates depending on the delay of the delayed wave.

Figure 11:
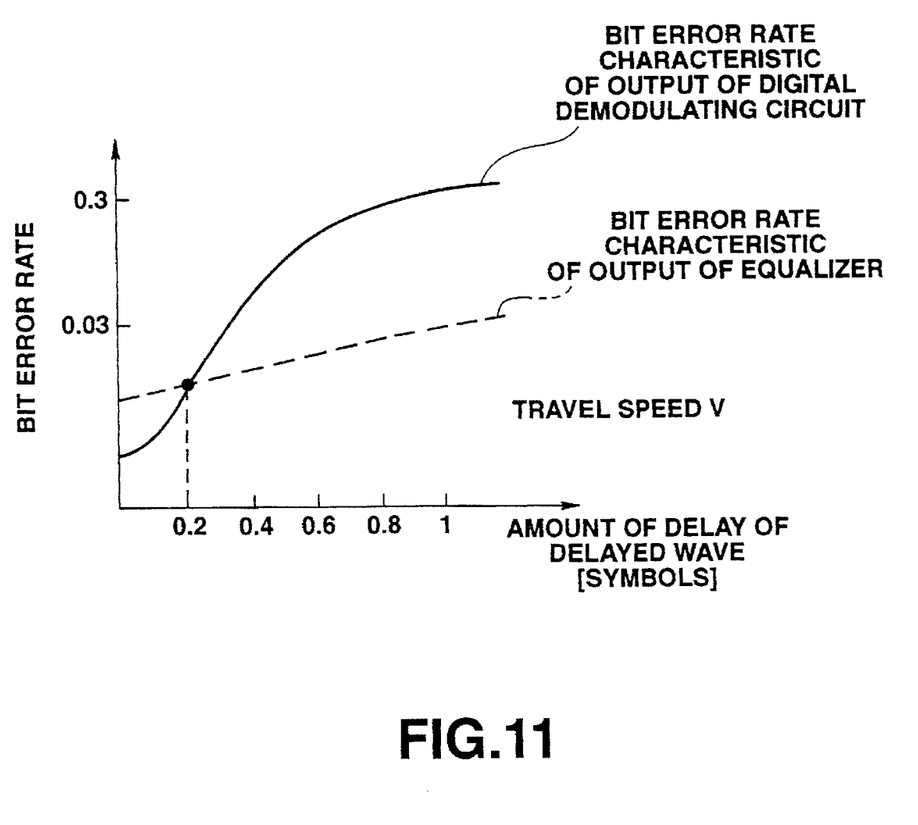
FIG. 11 is a characteristics diagram depicting bit error rate versus delayed wave amount of delay in this type of digital radio communication device.

For example, under conditions of reception of two-wave relay waves, digitally demodulated signal bit error rates vary with the amount of delay of the delayed waves in different ways in the manner depicted in FIG. 11, depending on whether the digitally demodulated signals that have been demodulated by the digital demodulation circuit are passed through an equalizer or not.

In the same drawing, the solid line indicates bit error rate characteristics of digitally demodulated signals demodulated in the digital demodulation circuit versus the amount of delay of the delayed waves, and the dashed line indicates bit error rate characteristics for signals produced by equalization in an equalizer of digitally demodulated signals demodulated in the digital demodulation circuit versus the amount of delay of delayed waves.

The same figure indicates that under conditions of a relatively large delay, a delayed wave delay of 0.2 symbols or above, the bit error rate is lower for signals passing through the equalizer. However, under conditions of a delay of less than 0.2 symbols, the demodulated signal error bit rate is lower for those not passing through the equalizer.

Therefore, conventional devices of this type designed so that digitally demodulated signals are always processed through an equalizer are susceptible to deterioration in bit error rate under conditions of a small delayed wave delay, thus lowering reception sensitivity.

In this way, conventional equalizer-equipped digital radio communication devices always process digitally demodulated signals through the equalizer, so that equalization processing is invariably performed even under conditions of an extremely small delayed wave delay such as that during reception of two-way relay waves, when better digitally demodulated signal bit error rates would be sustained by not passing them through the equalizer, and thus have the drawback that the digitally demodulated signal bit error rate is conversely increased.

An object of the present invention is to provide a digital radio communication device that does not perform equalization processing under conditions of extremely small delayed wave delay when better digitally demodulated signal bit error rates would be sustained by not passing them through the equalizer, and that outputs the unmodified output of the digital demodulation circuit as demodulated data so that good bit error rates can always be maintained regardless of delay wave delay, thus contributing to stabilized reception.

Another object of the present invention is to provide a digital radio communication device that achieves, in a simpler circuit structure and even at the expense of a certain amount of bit error rate suppressing effects, a control function whereby digitally demodulated signal bit error rates are always good regardless of delayed wave delay.

A further object of the present invention is to provide a digital radio communication device that can stably sustain a control function whereby digitally demodulated signal bit error rates are always good regardless of delayed wave delay, even cases when travel speed of the device itself changes.

DISCLOSURE OF THE INVENTION

The first invention of the present application is characterized by comprising digital demodulation means for digitally demodulating a received modulated signal and outputting a digitally demodulated signal, equalization means for performing waveform equalization on the output of the digital demodulation means, error estimation means for estimating an error rate of the output of the digital demodulation means, received signal level detection means for detecting a received signal level of the received modulated signal, characteristics holding means for holding characteristics pertaining to the error rate of the output of the digital demodulation means with respect to a received field strength, and selection control means for selecting the output of either the equalization means or the digital demodulation means as demodulated data on the basis of a result of error estimation by the error estimation means, the received signal level detected by the received signal level detection means and the characteristics held in the characteristics holding means.

The second invention of the present application is characterized by comprising digital demodulation means for digitally demodulating a received modulated signal and outputting a digitally demodulated signal, equalization means for performing waveform equalization on the output of the digital demodulation means, error estimation means for estimating an error rate of the output of the digital demodulation means, received signal level detection means for detecting a received signal level of the received modulated signal, travel speed computation means for computing a travel speed of the device on the basis of the detected received signal level, characteristics holding means for holding characteristics for each travel speed pertaining to the digital demodulation means output error rate with respect to a received field strength in the absence of delayed waves, specifying means for specifying a digital demodulation means output error rate corresponding to the detected received signal level at the computed travel speed on the basis of the held characteristics, comparing means for comparing the specified digital demodulation means output error rate and the estimated output error rate, and demodulated data selection means for selecting, on the basis of the comparison, the output of the equalization means as demodulated data in the event that the estimated output error rate exceeds the specified output error rate, or the output of the digital demodulation means as demodulated data in the event that the estimated output error rate is lower than the specified output error rate.

In the first invention of this application, while the characteristics pertaining to the digital demodulation means output error rate with respect to the received field strength are held in the characteristics holding means, the digitally demodulated signals output by the digital demodulation means are targeted for error estimation, with the received signal level being detected at the same time, and the output of either the digital demodulation means or the equalization means is selected on the basis of the results of the error estimation, the detected received signal level and the characteristics held in the characteristics holding means to obtain demodulated data.

Selection conditions may be designed, by checking the detected received signal level and the estimated digital demodulated output error rate with the characteristics held in the characteristics holding means, such that, for example, in the event that the results of error estimation at the received signal level are impossibly poor in spite of the fact that the signal level is sufficiently high, a determination is made that the error rate has deteriorated due to delayed waves, and the output of the equalizer, which is useful for preventing reduced error rate produced by delay, is selected while, on the other hand, when the results of error estimation are sufficiently low with respect to the received signal level, a determination is made that there is no delay, and the output of the digital demodulation means, which is more useful for preventing reduced error rate when there is no delay, is selected.

As a result of this control, the operation whereby digitally demodulated signals with a good error rate are output through the equalization means is maintained in cases when delay is detected, while digitally demodulated signals from the digital demodulation means are output without passing through the equalization means, which could degrade the error rate in cases when the delay is small, so demodulated data with a good bit error rate can always be obtained regardless of the presence or absence of delay.

In the second invention, characteristics for each travel speed pertaining to the digital demodulation means output error rate with respect to the received field strength in the absence of delayed waves are registered in advance, while the travel speed of the device is computed on the basis of the detected signal level, and the digital demodulation means output error rate corresponding to the detected received signal level at the computed travel speed is specified, after which the specified error rate and the estimated output error rate are compared, and as a result of this comparison, the output of the equalization means is selected as the demodulated data in cases when the estimated output error rate exceeds the specified output error rate, and the output of the digital demodulation means is selected as the demodulated data in cases when the estimated output error rate is lower than the specified output error rate.

In this way, with the second invention, an operation whereby digitally demodulated signals from the digital demodulation means are output without passing through the equalization means, which degrades the error rate in cases when the delay is small, is controlled with reference to the travel speed, so a stable reception operation with a good bit error rate can be sustained even when the travel speed of the device changes.

BEST MODE FOR CARRYING OUT THE INVENTION

Figure 1:
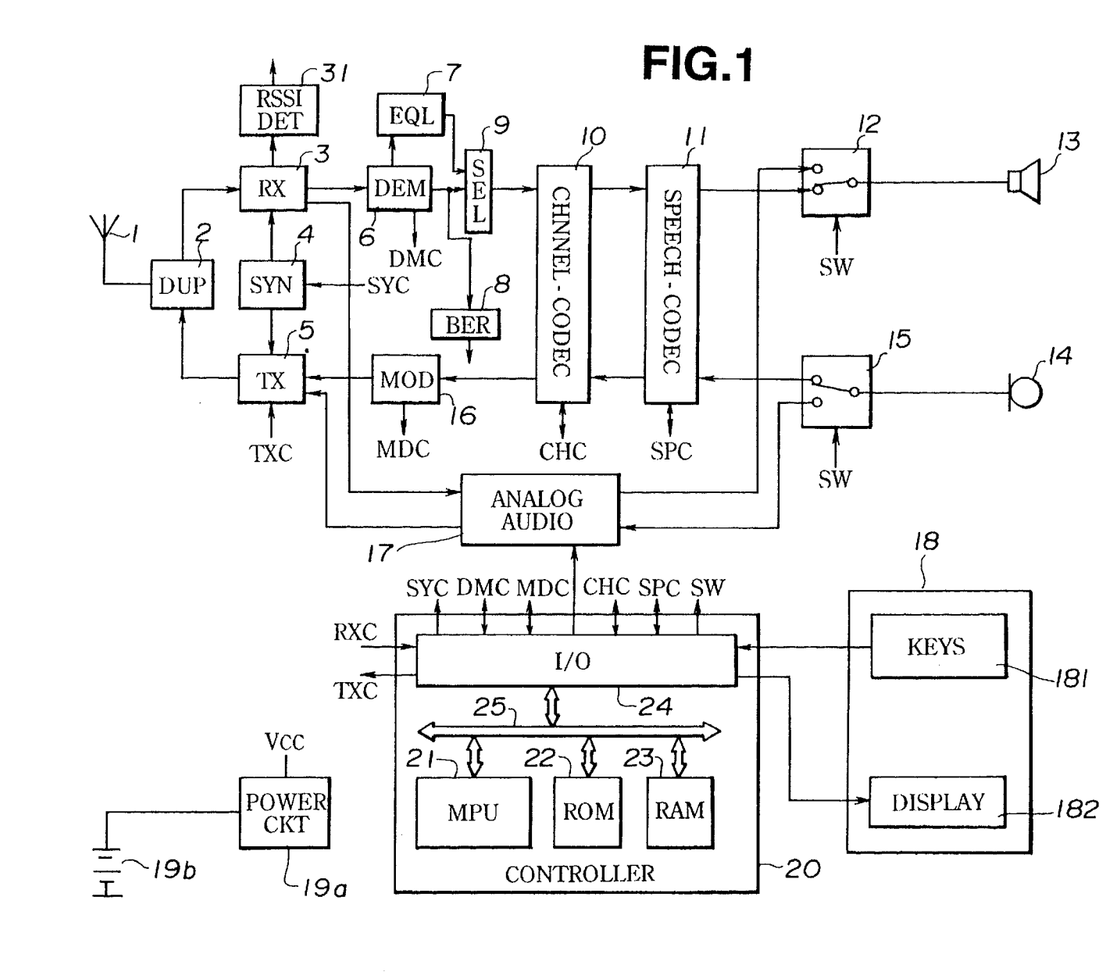
FIG. 1 is a block diagram depicting the overall structure of a digital radio communication device pertaining to an embodiment of the present invention.

An embodiment of the present invention will be described in detail below on the basis of the appended drawings. FIG. 1 is a block diagram depicting the overall structure of a digital radio communication device pertaining to an embodiment of the present invention, and the general operation is as follows.

Radio reception signals taken in from an antenna 1 (for example, π/4 shift DQPSK modulated signals) are input to the reception circuit 3 through an antenna duplexer 2. In the reception circuit 3 the received signals are synthesized with local oscillator signals output by a frequency synthesizer 4 and converted into intermediate frequency (IF) signals for output.

These received IF signals are converted to digital signals by an A/D converter which is not shown in the drawing and are then input to a digital demodulation circuit 6. The digital demodulation circuit 6 digitally demodulates the digitized received signals for output.

The output of the digital demodulation circuit 6 is input to the equalizer 7 as well. This equalizer 7 performs waveform equalization of the digitally demodulated signals. Either digitally demodulated signals output from this equalizer 7 or digitally demodulated signals output directly from the digital demodulation circuit 6 are selected for output by the selector 9. This selector 9 is switched by a selection control signal S6 output from a control circuit 20 through a process to be described later.

Digitally demodulated signals include both digital control signals and digital speech signals. Of these, digital control signals are taken in by the control circuit 20 and used in various sorts of control, while digital speech signals are input through selector 9 to an error-correcting encoding/decoding circuit (hereinafter termed digital codec) 10.

In the digital codec 10, an error-correcting decoding process is performed on the digital speech signals supplied from the digital demodulation circuit 6, and the error-correcting decoded digital speech signals are input to a speech encoding/decoding circuit (hereinafter termed speech codec) 11.

In the speech codec 11, the digital speech signals are subjected to a speech decoding process. The speech signals output from the speech codec 11 are converted to analog signals by a D/A converter not shown in the drawing and are then output to an analog switch 12. Alternatively, switch 12 passes signals received from analog audio 17.

Switching of the analog switch 12 is controlled by switch control signals SW, output from the control circuit 20, in such a way that when digital mode has been set analog speech signals output from the speech codec 11 are selected for output. Therefore, the speech signals output from the speech codec 11 are supplied to a speaker 13 through the analog switch 12 and are amplified and output from the speaker 13.

Outgoing speech signals taken in from a microphone 14 are input to an analog switch 15. At this time, switching of the analog switch 15 is controlled in response to switch control signals SW, output from the control circuit 20, in such a way that when digital mode has been set the outgoing speech signals are input to the speech codec 11.

Therefore, the outgoing speech signals are input through the analog switch 15 to an A/D converter not shown in the drawing and here are converted to digital outgoing speech signals and are then input to the speech codec 11. Alternatively, switch 15 passes signals to analog audio 17.

In the speech codec 11, the digital outgoing speech signals are subjected to speech encoding processing. The digital outgoing speech signals output from this speech codec 11 are input to a channel codec 10 together with digital control signals output from the control circuit 20.

In the channel codec 10, the digital outgoing speech signals and the digital control signals are subjected to an error-correcting encoding process. The coded digital outgoing speech signals are input to a digital modulation circuit 16.

In the digital modulation circuit 16, π/4 shift DQPSK-modulated modulated signals corresponding to the digital outgoing speech signals are generated. The modulated signals are converted into analog signals by a D/A converter not shown in the drawing and are then input to a transmission circuit 5.

In the transmission circuit 5, the modulated signals are synthesized with local oscillator signals output by the frequency synthesizer 4, converted into radio frequency signals, and also subjected to high-frequency amplification. Then, the radio transmission signals output from this transmission circuit 5 are supplied to the antenna 1 through the antenna duplexer 2 and are transmitted from the antenna 1. Power Vcc is supplied via power circuit 19a connected to power supply 19b.

Figure 2:
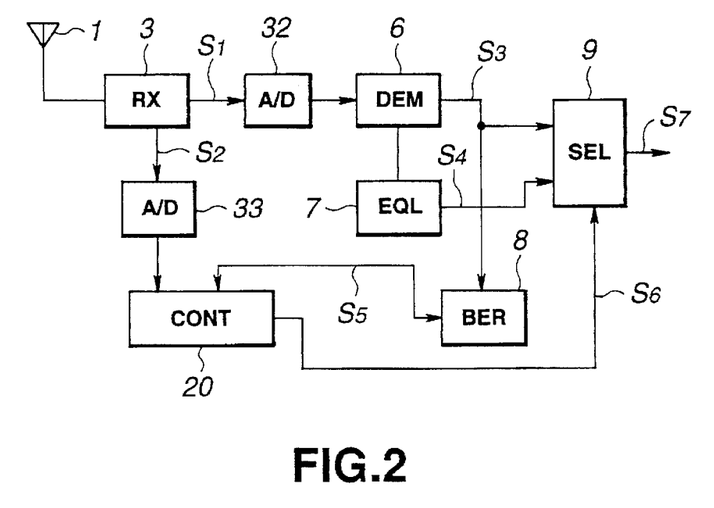
FIG. 2 is a block diagram depicting the principal component structure of the reception system in a digital radio communication device pertaining to an embodiment of the present invention.

Next, FIG. 2 is a principal circuit structure diagram of the reception system in the digital radio communication device of FIG. 1 with only the antenna 1, reception circuit 3, A/D converters 32 and 33, digital demodulation circuit 6, equalizer 7, bit error estimation circuit 8, selector 9, and control circuit 20 depicted, other circuit sections required in the device such as the transmission system being omitted. In this embodiment a structure whereby the received field strength detection circuit 31 depicted in FIG. 1 is included in the reception circuit 3 in FIG. 2 is supposed.

The general operation of these reception system circuit components will be described below. First, modulated signals (π/4 shift DQPSK-modulated signals) received by the antenna 1 are converted to intermediate frequency (IF) signals S1 in the reception circuit 3 and are output to the A/D converter 32. At the same time, in the reception circuit 3 the received signal level of the modulated signals is detected by the received field intensity detection circuit 31 and the detection results are output as received field strength indicator signals S2 to the A/D converter 33.

Of the output from the reception circuit 3, the IF signals S1 are quantized by the A/D converter 32 and are output to the digital demodulation circuit 6 which is a structural element of the modem.

The digital demodulation circuit 6 demodulates by delayed detection the original modulated digital data carried on the frequency and outputs it to the bit error estimation circuit 8 and the selector 9 as demodulated serial data S3.

Figure 3:
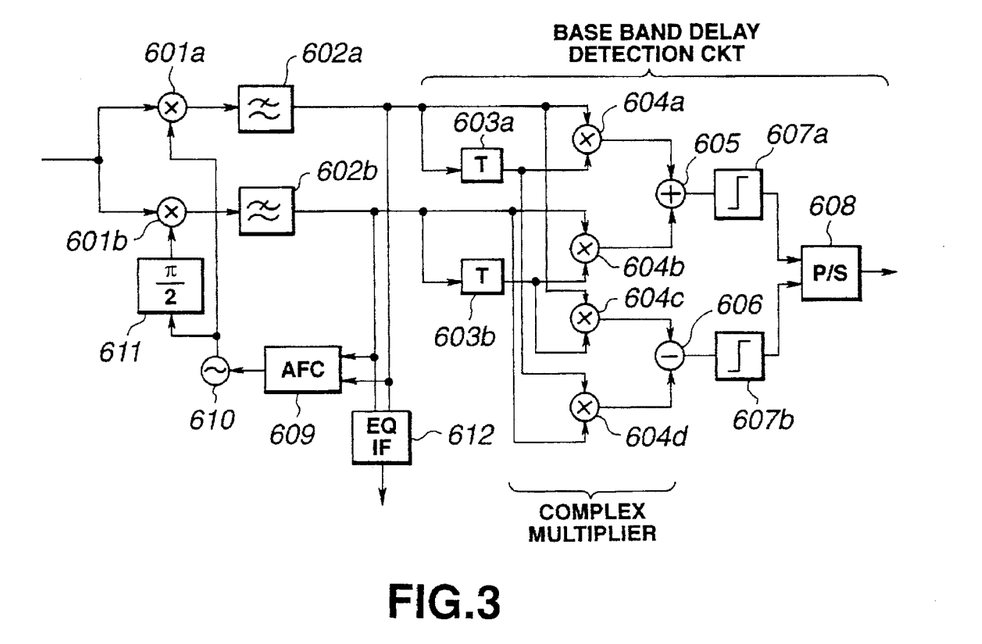
FIG. 3 is a circuit diagram depicting in detail the structure of the digital demodulation circuit (DEM) in FIG. 2.

FIG. 3 depicts the circuit structure of the digital demodulation circuit 6. The input for this digital demodulation circuit 6 is assumed to be A/D converted signals of modulated signals with the IF frequency as the carrier frequency, and the modulated signals are assumed to be π/4 shift DQPSK.

In the same drawing, 601a and 601b are multipliers, 602a and 602b are low-pass filters, 603a and 603b are 1 symbol delayers, 604a through 604d are multipliers, 605 is an adder, 606 is a subtracter, 607a and 607b are deciders, 608 is a parallel/serial converter, 609 is a frequency offset correction circuit, 610 is an oscillator, 611 is a π/2 phase converter, and 612 is an equalizer interface circuit.

With this digital modulation circuit 6, a frequency substantially identical to the IF frequency is generated by the oscillator 610, and this signal and the input signal are multiplied by the multipliers 601a and 601b and divided into I signal and Q signal. Then, as regards this I signal and Q signal, the low frequency components are extracted by the low-pass filters 602a and 602b, and next those signals are transferred to the equalizer 5 through the equalizer interface circuit 612.

Frequency offset components are detected by the frequency offset correction circuit 609 from signals transferred to this equalizer 5, and the generated frequency f of the oscillator 610 is adjusted by the oscillator 610 in the direction such that the offset is eliminated.

For the respective I signal and Q signal from which low frequency components have been extracted by the low-pass filters 602a and 602b, complex multiplication with signals delayed by one symbol in the one symbol delayers 603a and 603b is performed by the multipliers 604a through 604d, and the results of multiplication are added by the adder 605 or subtracted by the subtracter 606 to obtain (delay detection) demodulated signals.

These demodulated signals are determined as "1" or "0" by the deciders 607a and 607b, converted to serial signals by the parallel/serial converter 608, and output to the bit error estimation circuit 8 and the selector 9 as demodulated serial signals S3.

In contrast, as described above the equalizer 7 receives through the equalizer interface circuit 612 the received signals output from the digital demodulation circuit 6 through a Nyquist filter, performs equalization processing on these, and outputs them as demodulated serial data to the selector 9.

Figure 4A:
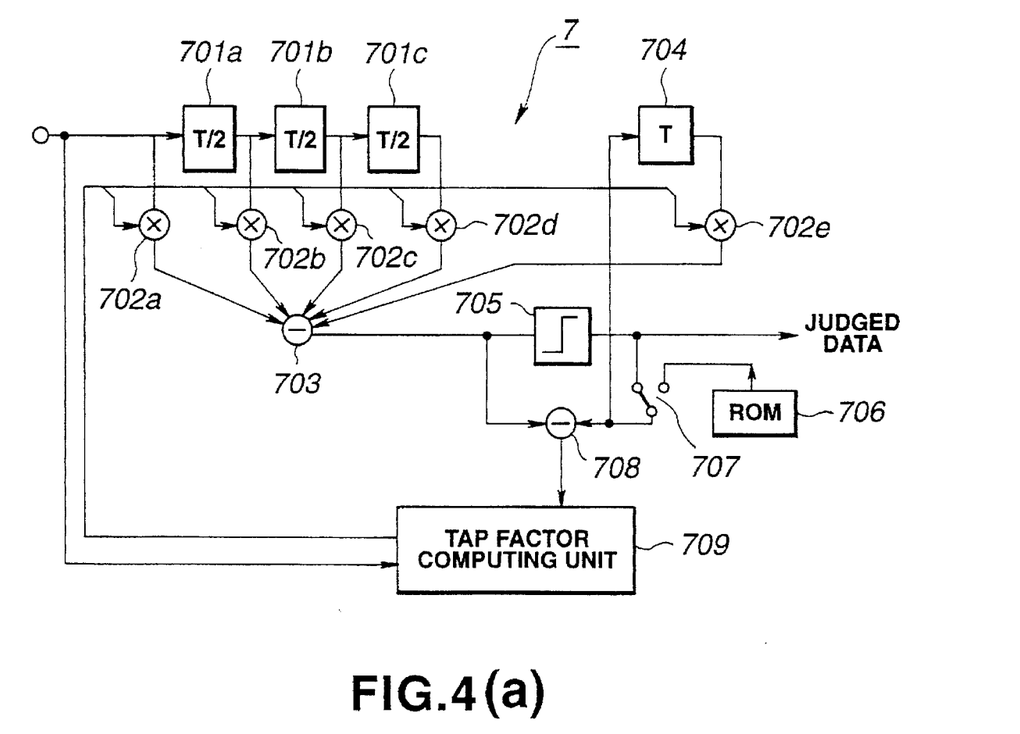
FIGS. 4(a) and 4(b) are diagrams depicting in detail the structure of the equalizer (EQL) in FIG. 2 and the frame structure of a signal handed by the equalizer.

FIG. 4(a) depicts one example of the circuit structure of this equalizer 7. This equalizer 7 is a fractional interval determination feedback equalizer using a transversal filter. In the same drawing, 701a, 701b, and 701c are ½-symbol delay circuits, 702a, 702b, 702c, 702d, and 702e are multipliers, 703 is an adder, 704 is a one-symbol delay circuit, 705 is a decider, 706 is ROM which stores a training sequence, 707 is a switch, 708 is a subtracter, and 709 is a tap factor calculator.

The switch 707 is normally on the demodulated data side and during the training period is switched to the ROM 706 side. The tap factor calculator 709 computes each tap factor for the transversal filter on the basis of error signals computed by the subtracter 708.

Figure 4B:
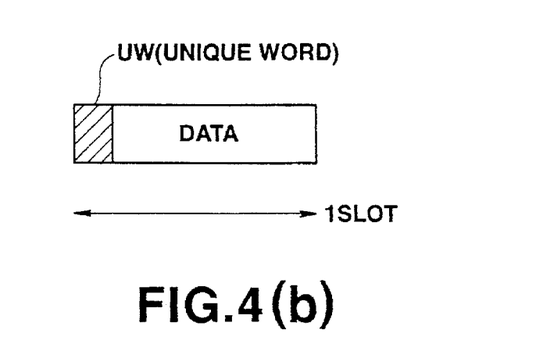

Here, the principal components of the frame structure of input signals handled by this equalizer 7 are like those depicted in (b) of the same figure, for example. This input signal has 3 slots in one frame, and one of those slots is the reception slot. A unique word for synchronization use is located in the leading position, and this is used as a training signal for the equalizer 7.

The equalizer 7 is initially set to initial values for each tap factor of the transversal filter. Next, during a new word period the switch 707 is connected to the ROM 706 side. The new word data is stored in the ROM 706 and this is used as a new word training signal so that the tap factors are set to optimal values.

Next, during data segment reception, the switch 707 is connected to the decided data side. To subsequently minimize error between the decided data and the transversal filter output, the tap factors for the transversal filter are calculated sequentially by the tap factor calculator 709. As a result, the characteristics of the transversal filter component assume characteristics that are the inverse of the transmission path characteristics, and distortion of the signal by the transmission path is equalized.

Meanwhile, the bit error estimation circuit 8 estimates bit error on the basis of the demodulated serial data S3 output by the digital demodulation circuit 6 and the estimation results are output to the control circuit 20 as estimated bit error signal S5.

Figure 5:
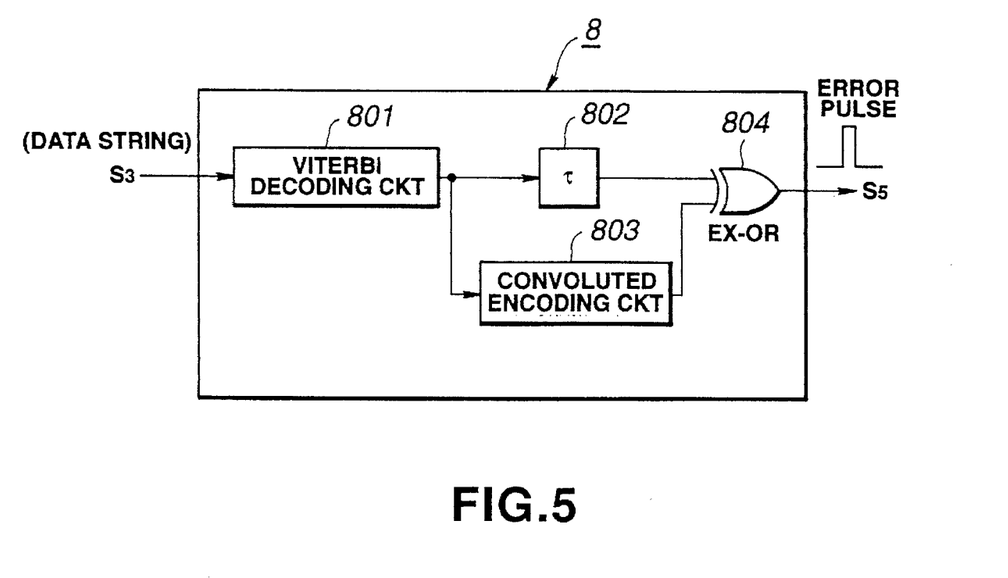
FIG. 5 is a diagram depicting in detail the structure of the bit error rate estimation circuit (BER) in FIG. 2.

FIG. 5 depicts an example of circuit structure of the bit error estimation circuit 8. In this bit error estimation circuit 8, first, the demodulated serial data S3 data string provided by the digital demodulation circuit 6 is Viterbi decoded by a Viterbi decoding circuit 801. After that, some of these decoded signals are delayed by the delay circuit 802 while others are coded by a convoluted encoding circuit 803, and error pulses obtained by passing these through an exclusive-OR circuit 804 are output as estimated error bit signal S5.

The control circuit 20 calculates the estimated error bit rate from the estimated error bit signal S5 passed through the foregoing process and output from the bit error estimation circuit 8 and generates, on the basis of these computation results and received field strength indicator signal S2 input from the reception circuit 3 through the A/D converter 33, selector control signal S6 for output to the selector 9. Control circuit 20 includes I/O 24, MPU 21, ROM 22, and RAM 23, which are connected by bus 25. Terminal 18, which includes keys 181 and display 182 interfaces with I/O 24.

Figure 6:
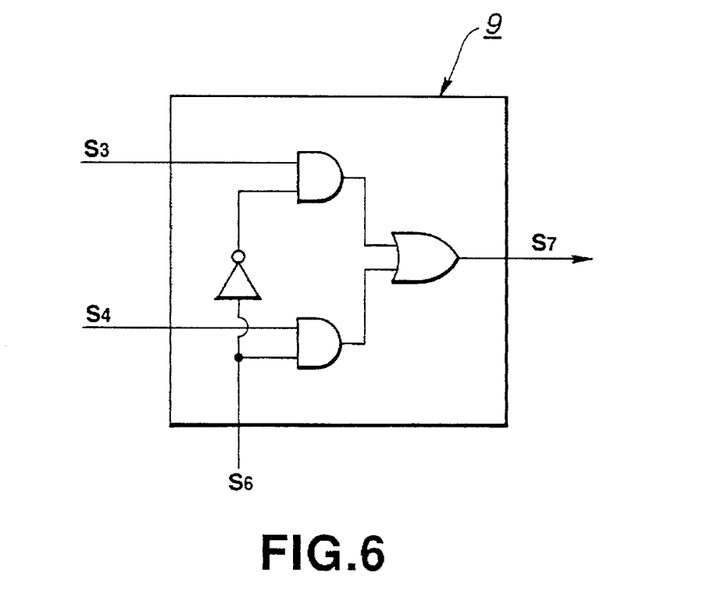
FIG. 6 is a diagram depicting in detail the structure of the selector (SEL) in FIG. 2.
Figure 7A:
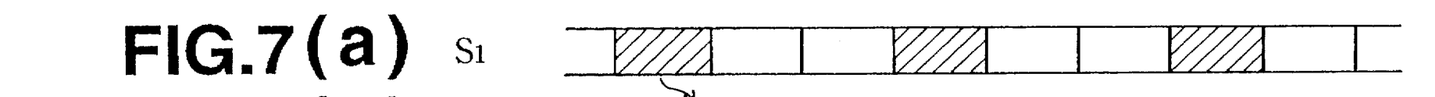
FIGS. 7(a) through 7(e) are time charts depicting signal waveforms in sections pertaining to the reception operation of the digital radio communication device in FIG. 2.
Figure 7B:
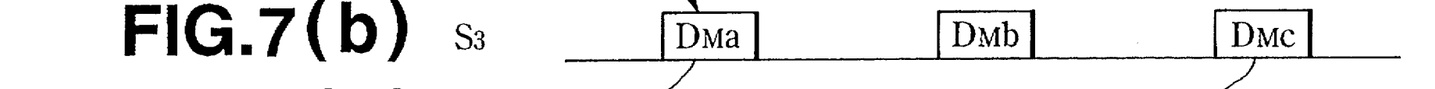
Figure 7C:
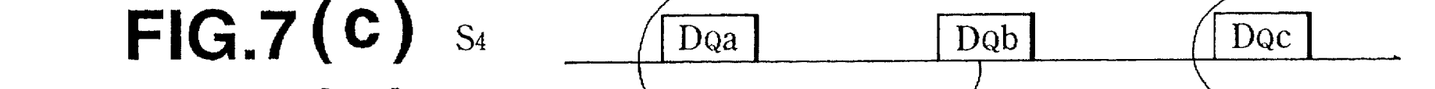
Figure 7D:
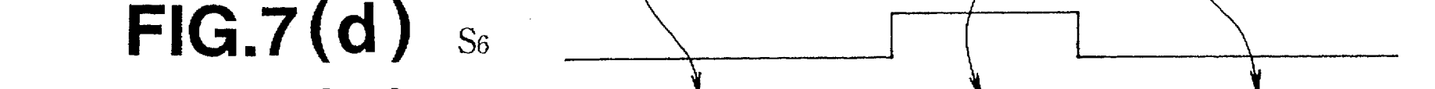
Figure 7E:
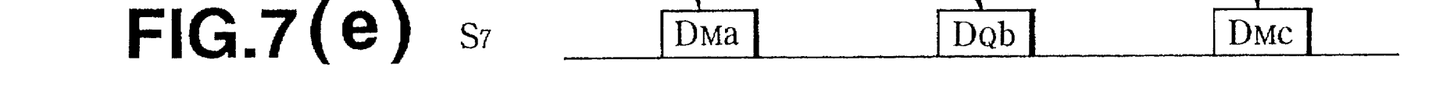

The selector 9 comprises, for example, logical circuits as depicted in FIG. 6, selects through the selector control signal S6 the demodulated serial data output by either the digital demodulation circuit 6 or the equalizer 7, S3 or S4, and outputs this as demodulated data S7.

FIGS. 7(a) through 7(e) are time charts depicting component signal waveforms during the reception operation of the reception system circuit components. As understood from the same drawing, in the device of the present invention, the IF signals S1 obtained from the received modulated signals (7(a) of the same drawing) are demodulated by the digital demodulation circuit 6, demodulated serial data S3 (7(b) of the same drawing) is output, that output is subjected to equalization processing by the equalizer 7 to obtain demodulated serial data S4 (7(c) of the same drawing), whereupon, when the selector control signal S6 (7(d) of the same drawing) is at "L" level, the demodulated serial data S3 from the digital demodulation circuit 6 is output as demodulated data S7 (7(e) of the same drawing), and when the selector control signal S6 is at "H" level, the demodulated serial data S4 from the equalizer 7 is output as demodulated data S7.

Figure 8:
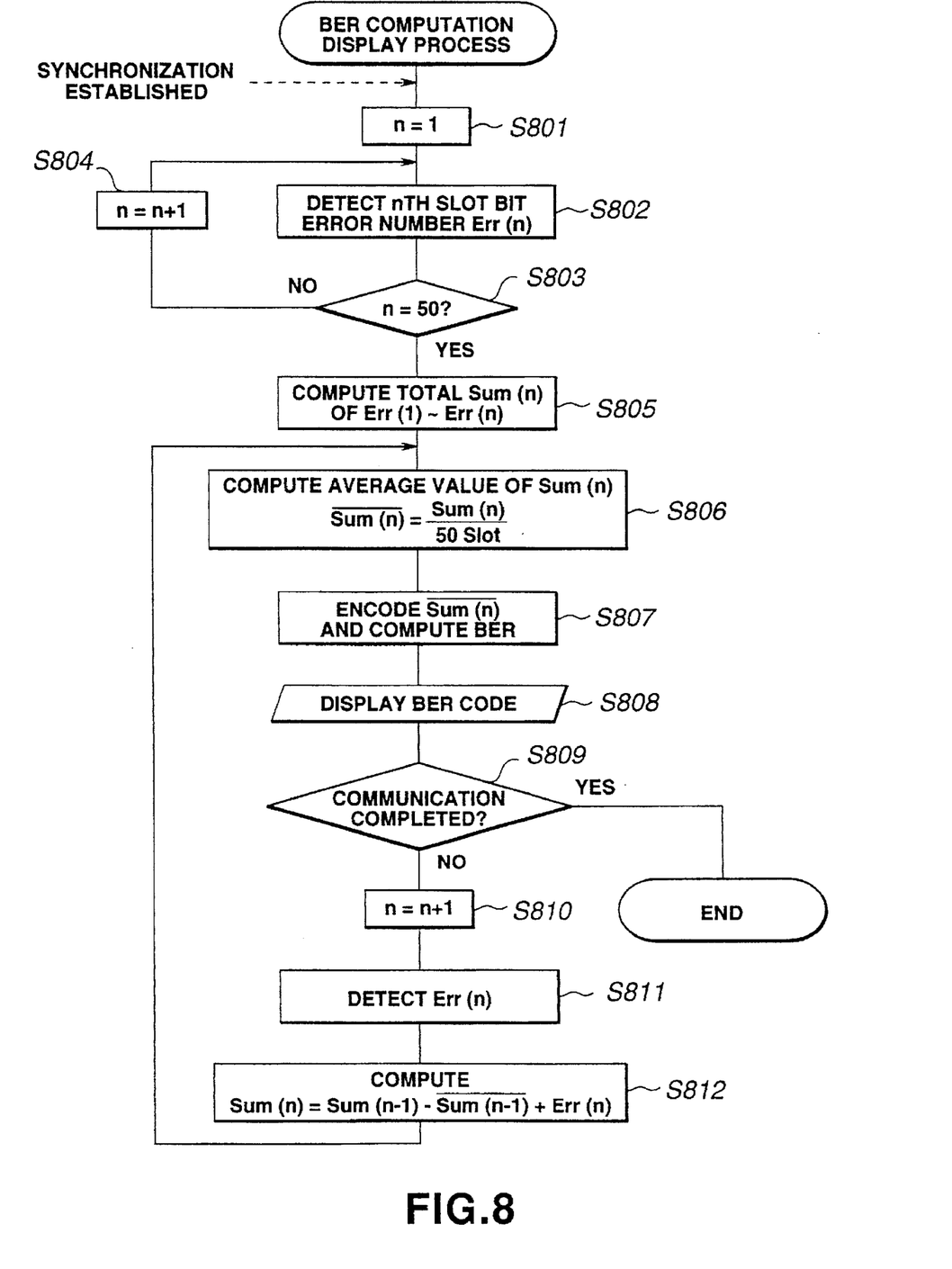
FIG. 8 is a flow chart depicting an example of bit error computation/display processing of the control component of the digital radio communication device in FIG. 2.

During the reception operation, computation of the estimated bit error rate (BER) on the basis of the estimated bit error signals S5 from the bit error estimation circuit 8 can be realized in the control circuit 20 by a process, for example, like that depicted in FIG. 8. The operation depicted in this FIG. 8 is a particular example in which the BER computation process and the display control of the computation results thereof are used conjointly.

First, the control circuit 20 begins, at the point at which reception synchronization has been established, a process for computing an BER initial value. This BER initial value is obtained by detecting the number of bit errors in each of the 50 slots, for example, that it is to receive initially and computing the average number of bit errors for these 50 slots.

Specifically, at the point at which reception synchronization has been established, the control circuit 20 first sets the counter count value n to "1" (step S801). Next, the number of bit errors Err(1) in the slot corresponding to the count number (n=1) is detected (step S802).

This bit error number Err(1) can be detected by counting, per slot unit, the estimated bit error signals S5 provided from the bit error estimation circuit 8. Another possible method for detecting the bit error number Err(1) involves comparing data prior to the error encoding correction decoding process in the channel codec 10 with received data subsequent to the error-correction decoding process.

When this first slot bit error number Err(1) has been detected, next the control circuit 20 then moves from step S803 to step S804, and here the counter value n is raised by one increment (n=n+1) and after this increase by one increment the number of bit errors Err(2) in the slot corresponding to the count number (n=2) is detected.

Subsequently, the routine of steps S802 through S804 is executed repeatedly in similar fashion until n reaches 50 in step S803. By this, the bit error numbers Err(3) through Err(50) in the slots which are the object of reception are detected sequentially. The values of these bit error numbers Err(1) through Err(50) detected in the slots which are the object of reception are temporarily stored in RAM 23 (not shown in FIG. 8).

When detection of the bit error numbers Err(1) through Err(50) in the 50 slots has been completed, next the control circuit 20 computes the total value Sum(n) of these bit error numbers Err(1) through Err(50) (step S805). The computational formula is as follows.

$$Sum(n)=Err(n-49)+Err(n-48)+\ldots+Err(n-1)+Err(n).$$

Next, the control circuit 20 computes the average value Sum(n)⁻ of the total value Sum(n) of the bit error numbers for the 50 slots (step S806).

The computational formula for this average value Sum(n)⁻ is expressed as $$Sum(n)^- = Sum(n)/50 \text{ slots}.$$

This computed 50-slot bit error number average value Sum(n)⁻ serves as the BER initial value. To compute this BER initial value, for example, requires approximately one second when one frame is 40 msec.

Next, the control circuit 20 converts the bit error number average value Sum(n)⁻ to BER code expressed in 8 levels (step S807). This BER code is displayed in the X9th position of the display 182 (step S808). In this case, when the BER code value is "6" or greater, this BER code value is a flashing display.

Now once the bit error number initial value has been detected, each time a new slot which is the object of reception (n=51, 52, ...) is subsequently received, the control circuit 20 computes a new bit error number average value on the basis of the detected value of the bit error number detected in this new slot which is the object of reception and the initial value of the bit error number mentioned above.

Specifically, when it is confirmed that communication is continuing (step S809 NO), the control circuit 20 raises the counter count number n by one increment (step S810) and detects the bit error number Err(n) of the received slot corresponding to this count value n that has been raised by one increment (step S811).

Next, the control circuit 20 computes a new bit error number total value Sum(n) augmented by the new received slot bit error number detected value Err(n). The computational formula is as follows.

$$Sum(n)=Sum(n-1)-Sum(n)^-+Err(n).$$

When this new bit error number total value Sum(n) has been computed, the control circuit 20 returns to step S806 and in this step S806 a new average value Sum(n)⁻ is computed on the basis of the bit error number total value Sum(n). Then, in step S807, the bit error number average value Sum(n)⁻ is converted to BER code expressed in 8 levels and this BER code is displayed in the X9th position of the display 182 in step S808.

Figure 9:
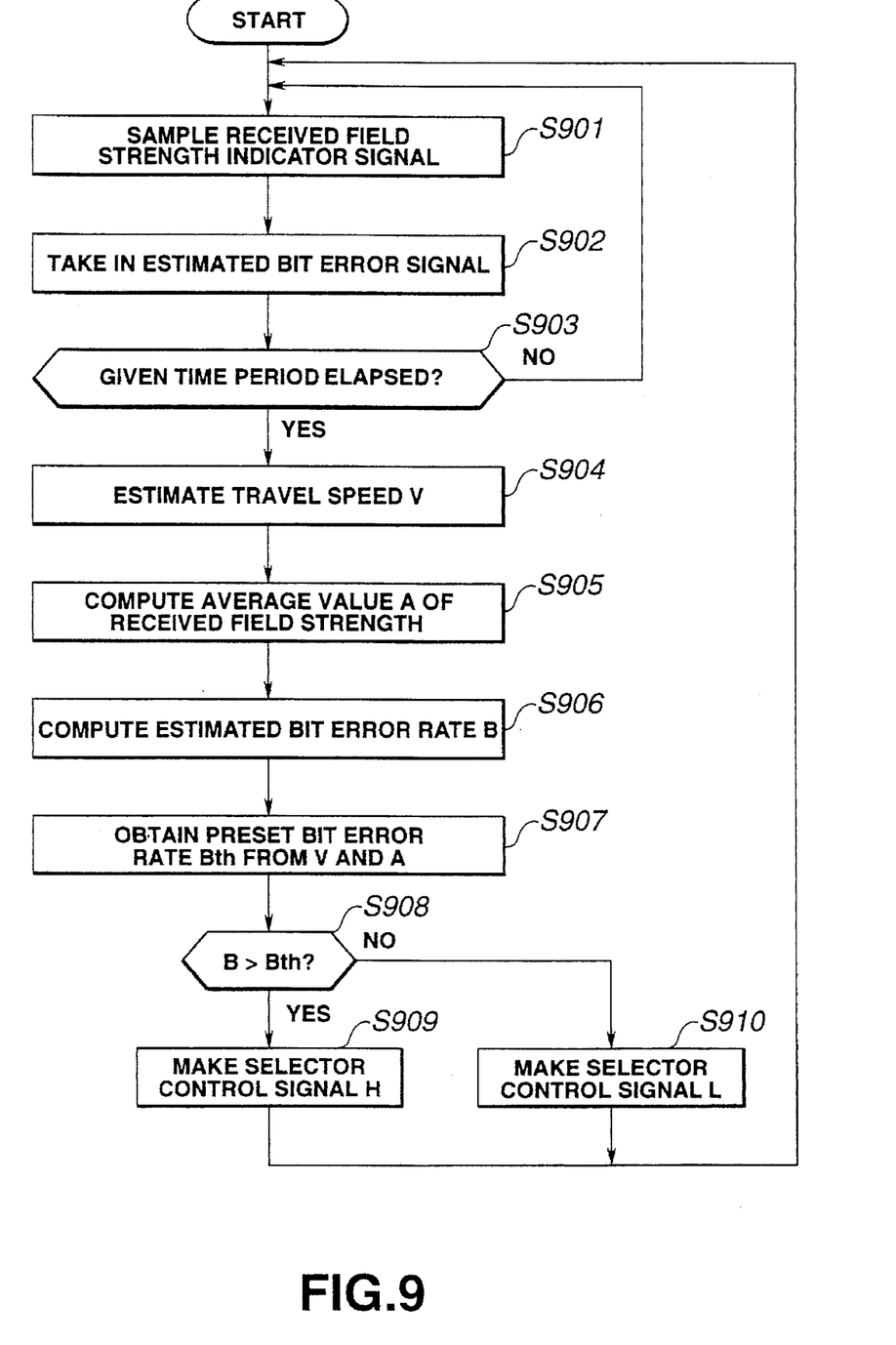
FIG. 9 is a flow chart depicting an example of a reception operation of the control component of the digital radio communication device in FIG. 2.

Next, selector control by the control circuit 20 (generation process of selector control signals S6) will be described in detail referring to the flow chart depicted in FIG. 9.

During the reception operation, the control circuit 20 takes in received field strength indicator signals S2 from the reception circuit 3 (step S901) and takes in estimated bit error signals S5 from the bit estimation circuit 8 (step S902); these two processes continue over a specified period of time.

Then, when the specified period of time has been confirmed to have elapsed (step S903 YES), first, the travel speed V of the communication device is estimated on the basis of the received field strength indicator signals S2 (step S904).

In general, when subject to fading the received field strength fp fluctuates by the frequency $fp=V/\lambda$ (where $\lambda$ is wavelength of the received frequency).

Therefore, by detecting the oscillation frequency of the received field strength indicator signals S2 by means such as FFT (fast Fourier transform) or the like, the travel speed V can be estimated by $V=fp \cdot \lambda$.

Next, the control circuit 20 computes the average value of the received field strength indicator signals S2 over the specified period of time and computes the current received signal level A (step S905).

At the same time as this, the control circuit 20 computes an estimated bit error rate B over the specified period of time on the basis of estimated bit error signals S5 provided from the bit error estimation circuit 8 (step S906). Computation of this estimated bit error rate B is realized utilizing, for example, the BER computation/display process depicted in FIG. 8.

Furthermore, on the basis of the travel speed V calculated in S904 and the received field strength A computed in step S905, the control circuit 20 recognizes the specified bit error rate Bth corresponding to the current received field strength A by referring to the bit error rate characteristics versus received field strength at that travel speed V in the absence of delayed waves (step S907).

The above-mentioned "bit error rate characteristics versus received field strength at travel speed V in the absence of delayed waves" can be stored, for example in ROM 22 of the control circuit 20.

Figure 10A:
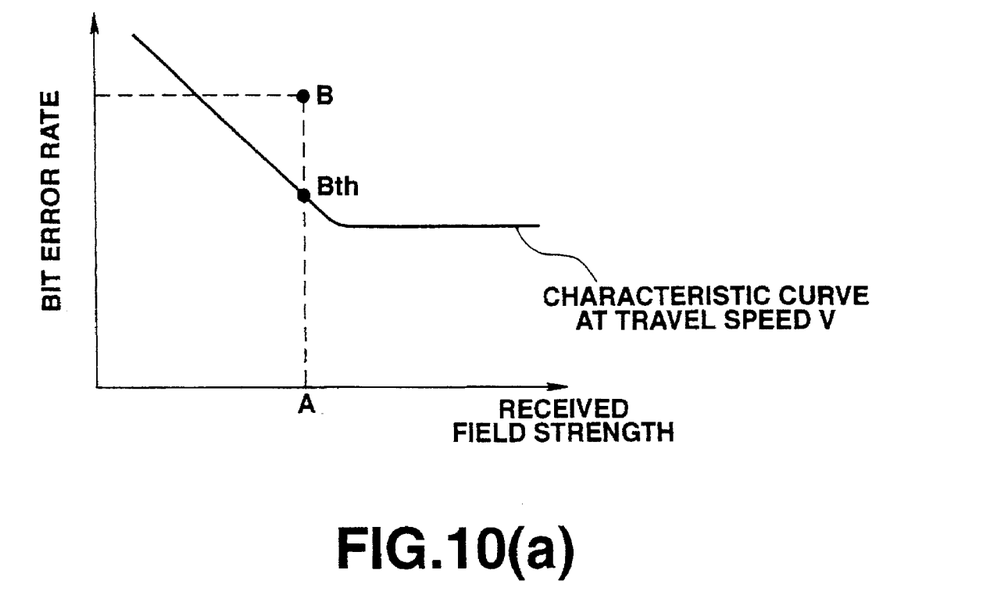
FIGS. 10(a) and 10(b) are characteristics diagrams depicting bit error rate versus received field strength at each travel speed in this type of digital radio communication device.

Specifically, in the absence of delayed waves, as depicted in FIG. 10(a), the bit error rate characteristics versus received field strength at travel speed V have been predetermined by the demodulation method of the digital demodulation circuit 6, so the control circuit 20 refers to these characteristics and recognizes the bit error rate Bth corresponding to the received field strength A detected at the current point in time.

Here, when it is considered that the characteristics are characteristics in the absence of delay, it can be determined that delay is occurring when the bit error rate B estimated during actual operation at travel speed V exceeds the bit error rate Bth and that there is no delay when it falls below the bit error rate Bth.

It can be seen by referring to FIG. 11 whether selection of the output from the digital demodulation circuit 6 or from the equalization 7 is more effective in terms of maintaining a good error rate in the presence and absence of delay. Specifically, as indicated in FIG. 11, when the delayed wave delay is 0.2 symbol or greater, the output of the digital demodulation circuit 6 has the higher bit error rate, so it can be determined with reference to the parameters obtained in the foregoing process that if B>Bth, the deterioration in the bit error rate is due to delayed waves.

Thus, it may been seen that at this time it is favorable to select the output S4 of the equalizer 7, which has a low bit error rate when delayed waves are present.

Conversely, if B≦Bth, it is favorable to select the output S3 of the digital demodulation circuit 6, which has a low bit error rate when delayed waves are absent.

On the basis of this premise, in the control circuit 20, the estimated bit error rate B computed in step S906 is compared with the bit error rate previously determined at the received signal level A point at the current point in time recognized in step S907 to determine whether it is greater or smaller in order to decide whether under current reception conditions the modulated serial data S3 from the digital demodulation circuit 6 should be selected or the modulated serial data S4 from the equalizer 7 should be selected (step S908).

Here, if B>Bth, it is determined that the bit error rate deterioration is due to the presence of delayed waves, and the selector control signal S6 is controlled to "H" level so as to select the output S4 from the equalizer 7, which has a low bit error rate when delayed waves are present (step S909).

Conversely, if it is determined that B≦Bth, the selector control signal S6 is controlled to "L" level so as to select the output S3 from the digital demodulation circuit 6, which has a lower bit error rate when delayed waves are absent (step S910).

After that, the control circuit 20 returns to the initial process of the flow chart (step S901) to perform the next determination within a fixed time.

Figure 10B:
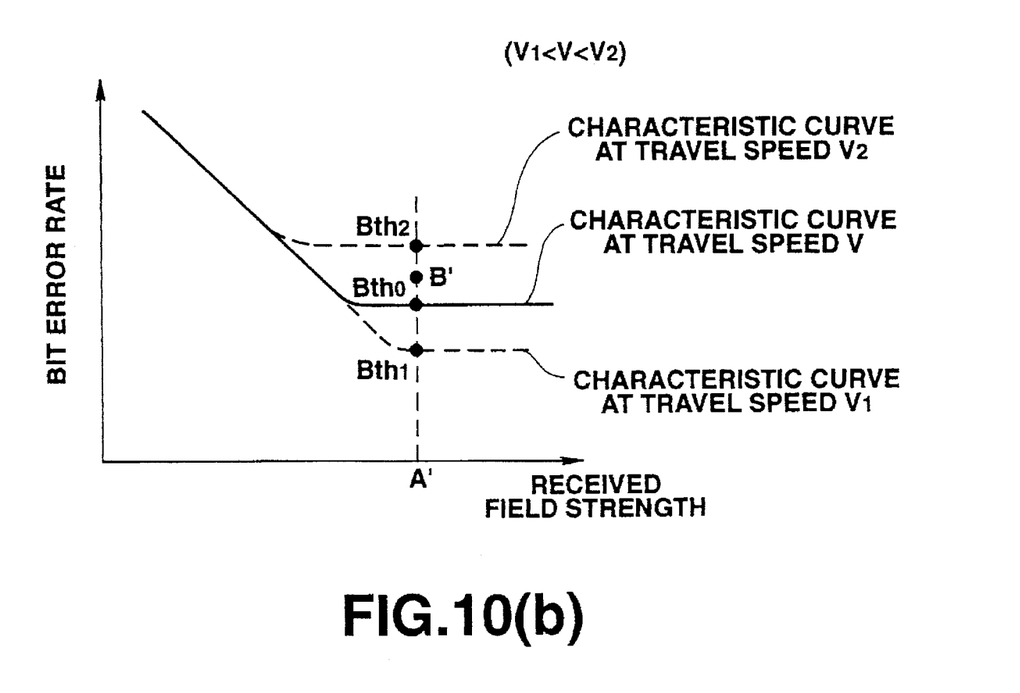

Further, the bit error rate characteristics versus received field strength in the absence of delayed waves in the case when travel speed V1 and V2 are included (where V1<V<V2) are depicted in FIG. 10(b). It may be understood from the same drawing that the bit error rate of the demodulated output of the digital demodulation circuit of the device which pertains to the present invention is higher the higher the travel speed.

By this, supposing a case in which the detected received field strength is A', the bit error rates Bth0~Bth2 corresponding to the switching point between the digital demodulation circuit 6 and the equalizer 7 by the selector 9 diverge due to the travel speeds. Therefore, assuming the BER actually detected at this time to be B', in order to sustain a low bit error rate at the time of travel speed V1, the selector is controlled so as to select the equalizer 7 output, while at travel speed V2 it is controlled so as to select the digital demodulation circuit output.

In this way, with the present invention, the presence or absence of delayed waves is recognized from received field strength indicator signals S2 and estimated bit error rate signals S5, and with reference to the results of recognition, either modulated serial data S3 or S4, whichever has the best bit error rate, is selected for output as demodulated data S7, so demodulated data with a good bit error rate can always be output regardless of the presence or absence of delayed waves, contributing to stabilized reception.

Possible means for selecting digitally demodulated signals output by the digital demodulation circuit 6 or the equalizer 7 are, for example, means for selecting digitally demodulated signals with reference to the amount of this delay. However, realization of this means requires massive computation capacity in detecting the amount of delay, so a high-speed computation circuit is required, which invites a more complicated and larger scale circuit, hindering design of a compact and lightweight device.

In contrast to this, according to the device of the above embodiment of the present invention, the amount of delay of delayed waves is not detected, but rather the amount of delay is estimated with reference to the results of estimation of digitally demodulated signal error and the results of detection of received signal level, so the circuit structure is simple and design of a compact and lightweight design can proceed. Therefore, in portable telephones, regarding which compactness and light weight are one issue of particular concern, application of the present invention is extremely effective for overcoming this issue.

From the standpoint of estimating the amount of delay of delayed waves, it is possible, for example, to gain a certain grasp of the amount of delay by monitoring the results of estimation of digitally demodulated signal error. Therefore, when precision is not of particular concern, another possible embodiment of the present invention is a structure whereby an estimated bit error rate computed on the basis of estimated bit error signals S5 given from the bit error estimation circuit 8 and a pre-established fixed error rate are compared, and the output of the equalizer 7 is selected only when the estimated bit error rate exceeds the established value. In this case, a circuit for detecting received field strength is unnecessary, which is more useful for producing a more compact machine.

INDUSTRIAL APPLICABILITY

As described above, the present invention is useful as a communication terminal in digital mobile radio communication systems such as car and mobile phone systems, cordless telephone systems, and other systems which experience significant variation in bit error rate characteristics versus the amount of delay induced by changes in travel speed, and since it does not directly detect the amount of delay of delayed waves, it can be used to realize a system that uses a relatively low-speed computation circuit with low computing capacity, and particularly a system in which a compact, lightweight device is desirable.

What is claimed is:

1. A digital radio communication device, comprising:

digital demodulation means for digitally demodulating a received modulated signal and outputting a digitally demodulated signal;

equalization means for performing waveform equalization on the output of the digital demodulation means;

error estimation means for estimating an output error rate of the digital demodulation means;

received signal level detection means for detecting a received signal level of the received modulated signal;

characteristics holding means for holding characteristics pertaining to an error rate of the output of the digital demodulation means with respect to a received field strength; and selection control means for judging whether delay of the received signal is present or not on the basis of a relationship between the estimated output error rate with respect to the received signal level detected by the received signal level detection means and the error rate of the output of the digital demodulation means when taking as a reference level, the received signal level detected by the received signal level detection means in the characteristics held in the characteristics holding means and, selecting the output of either one of the equalization means and the digital demodulation means as demodulated data in accordance with a judgment result.

2. A digital radio communication device as defined in claim 1, wherein the characteristics held in the characteristics holding means are characteristics for each travel speed pertaining to the error rate of the output of the digital demodulation means with respect to the received field strength in the absence of delayed waves, and wherein the selection control means comprises:

travel speed computation means for computing travel speed of the device on the basis of the detected received signal level;

specifying means for specifying a digital demodulation means output error rate corresponding to the detected received signal level at the computed travel speed on the basis of the characteristics held in the characteristics holding means;

comparing means for comparing the specified digital demodulation means output error rate and the estimated output error rate; and selection driving means for driving the selection means such that, on the basis of the comparison, the output of the equalization means is selected based on a judgment that the delay is present in the event that the estimated output error rate exceeds the specified output error rate, and the output of the digital demodulation means is selected based on a judgment that the delay is absent in the event that the estimated output error rate is lower than the specified output error rate.

3. A digital radio communication device as defined in claim 2, the selection control means further comprising:

first computing means for obtaining an average value within a given period of the received signal level detected by the received signal level detection means and second computing means for obtaining an average value within a given period of the output error rate estimated by the error estimating means, wherein a computed value by the first computing means is used as the received signal level and a computed value by the second computing means is used is the output error rate.

4. A digital radio communication device as defined in claim 1, wherein the received modulated signal is a π/4 shift DQPSK signal.

5. A digital radio communication device as defined in claim 1, wherein the digital demodulation means includes a delay detection circuit for digitally demodulating the modulated signal by delayed detection.

6. A digital radio communication device as defined in claim 1, wherein the equalization means comprises a fractional interval determination feedback equalizer using a transversal filter.

7. A digital radio communication device, characterized by comprising:

digital demodulation means for digitally demodulating a received modulated signal and outputting a digitally demodulated signal;

equalization means for performing waveform equalization on the output of the digital demodulation means;

error estimation means for estimating an output error rate of the digital demodulation means;

received signal level detection means for detecting a received signal level of the received modulated signal;

travel speed computation means for computing travel speed of the device on the basis of the detected received signal level;

characteristics holding means for holding characteristics for each travel speed pertaining to a digital demodulation means output error rate with respect to received field strength in the absence of delayed waves;

specifying means for specifying a digital demodulation means output error rate corresponding to the detected received signal level at the computed travel speed on the basis of the held characteristics;

comparing means for comparing the specified digital demodulation means output error rate and the estimated output error rate; and demodulated data selection means for selecting, on the basis of the comparison, the output of the equalization means as demodulated data in the event that the estimated output error rate exceeds the specified error output rate, or the output of the digital demodulation means as demodulated data in the event that the estimated output error rate is lower than the specified error output rate.

8. A digital radio communication device as defined in claim 7, wherein the received signal level and estimated output error rate are computed from average values resulting from sampling over a given period of time.

9. A digital radio communication device as defined in claim 7, wherein the modulated signal is a π/4 shift DQPSK signal.

10. A digital radio communication device as defined in claim 7, wherein the digital demodulation means includes a delay detection circuit for digitally demodulating the modulated signal by delayed detection.

11. A digital radio communication device as defined in claim 7, wherein the equalization means comprises a fractional interval determination feedback equalizer using a transversal filter.

* * * * *